United States Patent
Bregman et al.

(10) Patent No.: US 11,720,348 B2
(45) Date of Patent: Aug. 8, 2023

(54) COMPUTING NODE ALLOCATION BASED ON BUILD PROCESS SPECIFICATIONS IN CONTINUOUS INTEGRATION ENVIRONMENTS

(71) Applicant: RED HAT, INC., Raleigh, NC (US)

(72) Inventors: Arie Bregman, Gan Yavne (IL); David Sariel, Holon (IL)

(73) Assignee: Red Hat, Inc., Raleigh, NC (US)

(*) Notice: Subject to any disclaimer, the term of this patent is extended or adjusted under 35 U.S.C. 154(b) by 150 days.

(21) Appl. No.: 17/242,469

(22) Filed: Apr. 28, 2021

(65) Prior Publication Data

US 2022/0350596 A1 Nov. 3, 2022

(51) Int. Cl.
- *G06F 9/44* (2018.01)
- *G06F 8/71* (2018.01)
- *G06F 9/50* (2006.01)
- *G06F 9/48* (2006.01)

(52) U.S. Cl.
CPC .............. *G06F 8/71* (2013.01); *G06F 9/4881* (2013.01); *G06F 9/5055* (2013.01)

(58) Field of Classification Search
CPC ......... G06F 8/71; G06F 9/4881; G06F 9/5055
USPC ................................................ 717/168–178
See application file for complete search history.

(56) References Cited

U.S. PATENT DOCUMENTS

| | | | |
|---|---|---|---|
| 8,615,677 B2 * | 12/2013 | Barsness | G06F 9/5027 714/4.11 |
| 8,930,541 B2 | 1/2015 | Assuncao et al. | |
| 8,954,586 B2 | 2/2015 | Anderson et al. | |
| 8,997,093 B2 | 3/2015 | Dimitrov | |
| 9,189,275 B2 * | 11/2015 | Davidson | G06F 9/4881 |
| 9,276,816 B1 | 3/2016 | Conte et al. | |
| 9,959,147 B2 | 5/2018 | Rider | |
| 10,042,886 B2 * | 8/2018 | Saadat-Panah | H04L 67/1097 |
| 10,108,452 B2 * | 10/2018 | Chen | H04L 67/1001 |
| 11,099,892 B2 * | 8/2021 | Kambatla | G06F 9/4881 |

OTHER PUBLICATIONS

Abramson et al., "High Performance Parametric Modeling with Nimrod/G: Killer Application for the Global Grid?", 2000, IEEE, pp. 1-9. (Year: 2000).*
Gertsbakh et al., "Minimal Resources for Fixed and Variable Job Schedules", 1978, Operations Research, pp. 68-85.. (Year: 1978).*
Surianarayanan et al., "Essentials of Cloud Computing—A Holistic Perspective", 2019, Springer, 324 pages. (Year: 2019).*

(Continued)

*Primary Examiner* — Ted T. Vo
(74) *Attorney, Agent, or Firm* — Lowenstein Sandler LLP

(57) ABSTRACT

The technology disclosed herein enables computing node allocation based on build process specifications. An example method comprises receiving operational resource requirements of a software build job in a waiting state; identifying, for each computing node of a plurality of computing nodes associated with one or more other software build jobs, a respective set of operational resources installed on the computing node; identifying, among the plurality of computing nodes, a computing node having a minimal, among the plurality of computing nodes, difference between a set of operational resources installed in the computing node and the operational resource requirements of the software job; and scheduling the software build job to execute on the computing node.

17 Claims, 7 Drawing Sheets

(56) References Cited

OTHER PUBLICATIONS

Feng et al., "A Novel QoS-Aware Mechanism for Provisioning of Virtual Machine Resource in Cloud", College of Computer Science and Technology, Nanjing University of Aeronautics and Astronautics, Nanjing, China; College of Computer and Information, Hohai University, Nanjing, China, Jul. 31, 2015, 7 pages https://journals.sagepub.com/doi/10.1177/1748301816649077.

"Best Practices for Speeding Up Builds", Nov. 16, 2020, 5 pages https://cloud.google.com/cloud-build/docs/speeding-up-builds.

* cited by examiner

COMPUTING NODE ALLOCATION BASED ON BUILD PROCESS SPECIFICATIONS IN CONTINUOUS INTEGRATION ENVIRONMENTS

TECHNICAL FIELD

The present disclosure is generally related to build management, and more particularly, to allocating computing nodes based on the specifications of a build process in continuous integration environments.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

Figure 1:
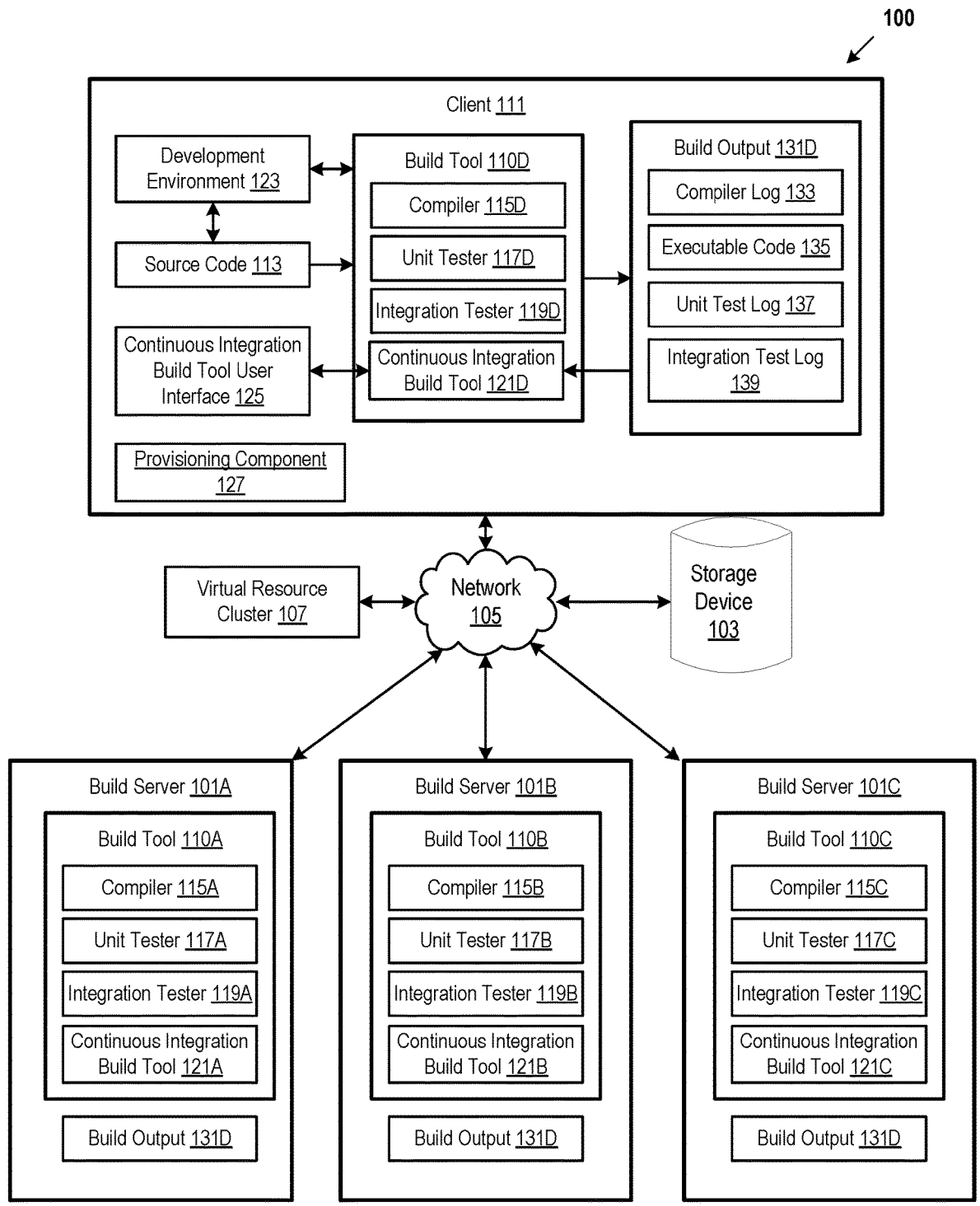
FIG. 1 depicts a high-level block diagram of an example computing environment that includes a provisioning component that schedules jobs for execution on provisioned computing nodes, in accordance with one or more aspects of the present disclosure.

Continuous software integration tools, referred to herein as "build tools," may perform build processes to generate software images from source code and other data. Software images may be, for example, executable code of software application programs. Source code may include instructions in a programming language that may be translated to executable code. The translation from source code to executable code may be performed by compiler programs. Other data may also be processed, e.g., transformed to suitable formats, and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built. A particular set of instructions specifying how to perform a particular build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which are may be executed sequentially in an active build. A job may thus be referred to as a "pipeline" of one or more stages. The stages may include, for example, compile, test, and deploy stages. The compile stage may translate source code to executable code, the test stage may perform tests to verify that the executable code operates correctly, and the deploy stage may install the executable code on host machines, for example. A build may execute for a substantial period of time (e.g., several minutes to several hours or days).

Computing nodes may be selected from a pool of available computing nodes and each computing node may include a different set of computing resources. Computing resources may include central processing unit(s) (CPU(s)), memory (e.g., volatile memory such as random access memory (RAM)), non-volatile memory, network bandwidth, etc. A scheduled job may be placed in a first-in, first-out (FIFO) build queue and the next available computing node from the node pool may be assigned to execute the next waiting job.

Prior to executing a job, a client device may install operational resources for the scheduled job. The operational resources may include operating systems, application packages, computer services, etc. An application package may be any type of software package deployable on the computing node, such as, for example, virtual machines, containers, databases, web applications, web services, caches, libraries, multimedia applications, etc. A computer service may be any type of function(s) provided by and/or to the computing nodes, such as, for example, web services, synchronization services, data services, operating system services, management services, drivers, etc. After the job is executed, the host system may execute a cleanup process to remove the operational resources installed for the executed job, and install a new set of operational resources as required by the next scheduled job.

However, in some instances, the next scheduled job may require the same or a similar set of operational resources as those that are already installed on the computing node from the previously executed job. As such, executing the cleanup process on the computing node and reinstalling the same or a similar set of operational resources is redundant, leads to delays in job execution, and poor utilization of computing resources. Accordingly, it is desirable to provide the ability to execute scheduled jobs on the already enabled and/or installed operational resources of computing nodes.

Aspects of the present disclosure address the above-noted and other deficiencies by enhancing a build system with the ability to execute scheduled jobs utilizing the existing operational resources of a computing node. In an illustrative example, the provisioning component may detect a job executing on a computing node. The build system may identify the operational resources installed or enabled, by the host system running on the computing node, for the executing job. For example, the computing node may generate a resource log during the execution of the final stage of the job's pipeline, and the build system may retrieve the resource log. By way of illustrative example, the resource log may indicate that the host system has a specific type of operating system installed, a pair of virtual machines running, a pair of specific application packages installed, and a pair of specific services running.

The build system may then detect a job scheduled for execution. For example, the build system may detect the scheduled job in a waiting state in a build queue. The build system may determine, using a set of parameters associated with the scheduled job, the computing resources (e.g., CPU resources memory resources, I/O resources, network resources, etc.) and operational resources (e.g., type of operating system running, types of application packages installed, types of computer services enabled, etc.) required by the scheduled job. Specifically, the build system may identify, at a minimum, which computing resources are necessary to execute the scheduled job, which operational resources are required to be enabled or installed on the computing node, and which operational resources should be uninstalled or disabled on the computing node. In some embodiments, application packages may be installed on and uninstalled from a computing node and computing services may be enabled and disabled on the computing node. In an example, the scheduled job may require two 2.4 megahertz (MHz) processors, 2 gigabytes (GB) of RAM memory, a virtual machine to operate on a specific type of operating system, the virtual machine to have specific application packages installed, and to have a specific computer service enabled. In addition, the scheduled job may further require that the application packages each be of a specific version, and that another specific service be disabled in order to prevent them from interfering from the installed resources. The build system may then compare the minimum requirements of the scheduled job to the computing resources of the computing node and the operational resources installed or enable on the computing node to determine whether the resources requirements of the scheduled job are satisfied by the computing node. If the resource requirements are satisfied, the build system may schedule the scheduled job to execute on the computing node once the executing job is complete.

If the resource requirements are not satisfied, the build system may determine which operational resources need to be installed, uninstalled, enabled, and/or disabled from the commuting node to satisfy the requirements of the scheduled job. Application packages, such as virtual machines, containers, databases, web applications, web services, caches, libraries, multimedia applications, etc., may be installed on or uninstalled from the build system. Computer services, such as web services, synchronization services, data services, operating system services, management services, drivers, etc., may be enabled or disabled on the build system. Once the required operational resources are determined, the build system may then install, uninstall, enable, and/or disable the necessary operational resources from the computing node to meet the requirements of the scheduled job.

The build system may then cause the scheduled job to execute on the computing node once the currently executing job is complete. Accordingly, aspects of the present disclosure prevent executing redundant operations, prevent delays in job execution, and improve utilization of computing resources.

Various aspects of the above referenced methods and systems are described in details herein below by way of examples, rather than by way of limitation. The examples provided below discuss a provisioning component that schedules jobs for execution in view of the minimum requirements of the scheduled job to the computing resources and operational resources of a computing node. In other examples, the methods and systems described herein may be performed by any suitable component that interacts with the provisioning component.

FIG. 1 depicts a high-level block diagram of an example computing environment 100 that includes a provisioning component 127, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110A-D. Client 111 may further include provisioning component 127 to enable the execution of a job executing on a provisioned build server 101A. Provisioning component 127 will be explained in greater detail with references to FIG. 2 below.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example. Continuous integration build tool 121A-D may generate an integration test log 139 containing information describing the progress of the operations performed by the continuous integration build tool 121A-D.

Integration tester 119A-D may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system, created using software, that includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101A-C and/or client 111. In another example, virtual resource cluster 107 may include one or more other computing machines not shown by FIG. 1. The computing machines may be server computer systems, desktop computers or any other computing devices.

A host machine may allocate a certain amount of its computing resources (e.g., processor resources (CPU resources), physical or virtual memory, input/output (I/O) resources, network resources, etc.) to individual virtual resources (e.g., a virtual machine, container), and may multiplex the underlying hardware platform (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor may emulate the underlying hardware (e.g., infrastructure) of the host machine, making use of the virtual machine. Accordingly, each build tool 110A-D (or build server 101A-C and/or client 111) may be allotted a different set of computing resources. By way of illustrative example only, build tool 110A may be allotted two 2.4 megahertz (MHz) processors, and 2 gigabytes (GB) of RAM memory, build tool 110B may be allotted four 3.2 MHz processors and 16 GB of RAM memory, etc.

An application being deployed in the container may run under the host operating system. The host machine for the container may include a container engine to create and manage the containers. In one implementation, a container may run on a virtual machine to provide an extra layer of separation between applications running on a guest operating system of the virtual machine. In one implementation a virtual machine may run on a container to maintain isolation and security properties of virtual machines while being able to package and distribute computer programs as a container.

Integration tester 119A-D may run the executable code 135 in virtual resource cluster 107, and run integration tests against the distributed system being provided by virtual resource cluster 107. After build tool 110A-D compiles the source code 113 and runs unit tests and integration tests, build tool 110A-D may report whether the attempt to provide the build was a success or includes a failure. A failure may be caused by the compiling of the source code failing, unit testing failing, and/or integration testing failing.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

Figure 2:
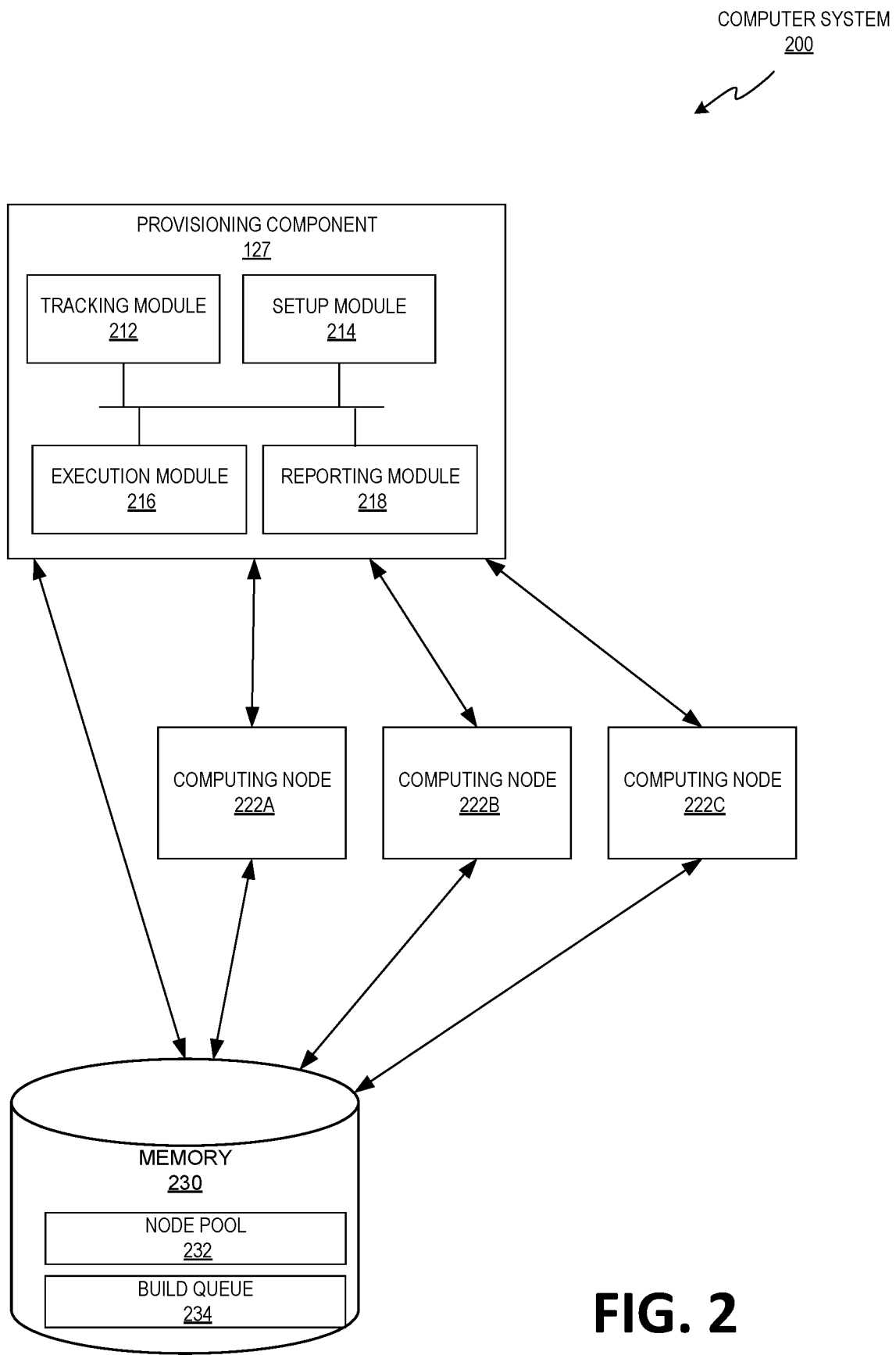
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may include provisioning component 127, computing nodes 222A-222C, and memory 230. Provisioning component 127 may run executable code that implements one or more of the components and modules and may be implemented within a host operating system, a hypervisor, a guest operating system, a container, hardware firmware, or a combination thereof. Provisioning component 127 may include tracking module 212, cleanup module 214, execution module 216, and reporting module 218. Computing node 222A-C may be a virtualized or bare metal computing device such as a server computer, a desktop computer, a portable computing device, etc. Memory 230 may include node pool 232 and build queue 234.

Tracking module 212 may track which computing nodes 222A-C are executing active builds and display the active builds in an active build list. In one example, tracking module 212 may maintain a node state metadata table indicating which computing nodes 222A-C are in an active state (e.g., executing an active build) and which computing nodes 222A-C are in a waiting state (e.g., not executing an active build). In another example, tracking module 212 may determine whether a computing node is active based on the computing node's inclusion in the node pool (e.g., if a computing node is not in the node pool, then that computing node may be determined to be active). A node pool may be a data structure used to queue computing nodes that are in a waiting state. In some embodiments, tracking module 212 may communicate with each computing node 222A-C to periodically update the node pool. In one example, tracking module 212 may communicate with each computing node 222A-C via a program capable of handling periodic requests (such as a daemon) to determine the state (e.g., active state, waiting state, etc.), of each computing node 222A-C. In another example, tracking module 212 may read one or more logs generated by each computing node 222A-C, where each log may indicate whether the respective computing node 222A-C is in an active state, a waiting state, etc. In yet another example, tracking module 212 may listen to network traffic generated by each computing node 222A-C to determine the state of each computing node 222A-C. For example, tracking module 212 can capture data packets transmitted or received by each computing node 222A-C using, for example, a packet sniffer, a filter, etc.

Tracking module 212 may maintain and update a computing resource metadata table used to indicate which computing resources (e.g., CPU resources memory resources, (I/O) resources, network resources, etc.) are allotted to each computing node 222A-222C. For example, computing node 222A may be allotted two 2.4 megahertz (MHz) processors, and 2 gigabytes (GB) of RAM memory, computing node 222B may be allotted four 3.2 MHz processors and 16 GB of RAM memory, etc. Tracking module 212 may update the computing resource metadata table using, for example, a program capable of handling periodic requests (e.g., a daemon), logs generated by each computing node 222A-C, network traffic generated by each computing node 222A-C, etc.

Tracking module 212 may further maintain and update an operational resource metadata table used to indicate the operational resources (e.g., type of operating system running, types of application packages installed, types of computer services enabled, etc.) provisioned to each computing node 222A-222C. An application package may be any type of software package deployable (installable) on the computing node, such as, for example, virtual machines, containers, databases, web applications, web services, caches, libraries, multimedia applications, etc. A computer service may be any type of functions provided to the computing nodes, such as, for example, web services, synchronization services, data services, operating system services, management services, drivers, etc. Tracking module 212 may update the operational resource metadata table using, for example, a program capable of handling periodic requests, logs generated by each computing node 222A-C, network traffic generated by each computing node 222A-C, etc.

Tracking module 212 may further track jobs, using the node state metadata table, awaiting a computing node. Tracking module 212 may store jobs in a waiting state in build queue 234. In some embodiments, jobs in build queue 234 are stored in the first-in, first-out order. Jobs in build queue 234 can be removed, by tracking module 212, from the build queue 234 when active builds of the jobs begin. The active builds can then be added to an active build list. In some embodiments, tracking module 212 may display available computing nodes, busy computing nodes (e.g., computing nodes executing active builds), computing resources of each computing node, operational resources of each node, and queued jobs on a GUI (e.g., continuous integration build tool user interface 125).

Each job may be associated with one or more computing resources tags indicating the type of computing resources that are necessary to execute the job. For example, each computing resource tag may indicate a minimum processing power required, a minimum memory required, and any additional computing requirements (e.g., network capabilities, I/O components, etc.). The computing resources tag may be assigned to a job by tracking module 212, manually assigned by a user via a user interface, or any combination thereof. Tracking module 212 may determine which computing resources tag to assign using, for example, a computing resource tag database. The computing resource tag database may include correlations between job parameters and types of operational computing. A job parameter may include any characteristic associated with the job, such as the computing language the job is written in, the commands written in the computing code of the job, time required to process the job, etc.

Further, each job may be associated with one or more operational resource tags indicating the type of operational resources that need to be provisioned (e.g., installed, enabled, set-up, etc.) to the job. An operational resource may include an operating system, an application package, a computer service, etc. For example, each operational resource tag may indicate the type of operating system required for the job to execute on, the type of application packages required for the job, the type of computer services required for the job, etc. In some embodiments, operational resource tags may further include operational resources that are to be precluded from being installed or enabled on the computing node. In one example, a job may include an operational resource tag indicating that certain drivers are not to be enabled on the computing node. In another example, a job may include an operational resource tag indicating that certain versions of a database or library are not to be installed.

In some embodiments, the operational resource tags may be manually assigned by a user via a user interface (e.g., continuous integration build tool user interface 125). For example, the user may select the type of operating system required, which application packages are required, which version of one or more of the application packages is required, which computer services are required, which version of the computer services are required, etc. In some embodiments, tracking module 212 may automatically assign one or more operational resource tags using, for example, an operational resource tag database. The operational resource tag database may include correlations between job parameters and types of operational resources. A job parameter may include any characteristic associated with the job, such as the computing language the job is written in, the commands written in the computing code of the job, time required to process the job, etc.

In some embodiments, tracking module 212 may determine that a scheduled job (a job in a waiting state) may execute on an available or soon to be available computing node without first performing a full cleanup process (e.g., uninstall and/or disable all operational resources from the computing node). Tracking module 212 may determine whether a computing node is soon to be available in view of, for example, which stage of the pipeline the computing node is executing (e.g., a computing node is soon to be available when the final stage of the pipeline is being executed), whether a time value exceeds a threshold criterion (e.g., a time value exceeds 95% of a job's scheduled execution time), etc. In particular, tracking module 212 may scan build queue 234 for a job awaiting executing. For example, tracking module 212 may select the next scheduled job in build queue 234. Tracking module 212 may then determine whether the computing resources of the available or soon to be available computing node are sufficient to execute the scheduled job. For example, tracking module 212 may compare the computing resource requirements required for executing the scheduled job to the computing resources provided by the computing node. Tracking module 212 may determine the computing resources of an available (e.g., recently released) computing node or soon to be available computing note by sending a status request to the computing node, reading one or more logs generated by computing node, listening to network traffic generated by computing node 222B, reading the computing resource metadata table, etc. In response to the computing resources of the computing node being insufficient for the scheduled job, tracking module may proceed to the next scheduled job in build queue 234 to determine whether the computing node is sufficient, and so on. In response to the computing resources of the computing node being sufficient for the scheduled job, tracking module 212 may then determine whether the operational resources installed and/or enabled on the computing node are sufficient to execute the scheduled job.

To determine whether the operational resources of the available or soon to be available computing node are sufficient to execute the scheduled job, tracking module 212 may first determine the operational resources of said computing node. In particular, tracking module 212 may send a status request to the computing node, read one or more operational resources logs generated by computing node, listen to network traffic generated by the computing node, read the operational resource metadata table, etc. For example, the computing node may generate an operational resources log during execution of the execution of any stage of its pipeline (e.g., during the execution of the final stage of its pipeline) and tracking module 212 may obtain the operational resources log. Tracking module may then determine whether the installed or enabled operational resources of the available or soon to be available computing node are suitable for scheduled job. Additionally, tracking module 212 may further determine whether the computing node includes one or more operational resources that the scheduled job precludes.

Tracking module 212 may compare the required operational resources of the scheduled job to the operational parameters installed or enabled on the computing node. For example, in response to the scheduled job requiring a specific operating system, two specific application packages, and precluding a specific computer service, tracking module 212 may determine whether the operating system required by the scheduled job is installed on the computing node, whether both application packages are installed, and whether the computer service is disabled.

In response to determining that the operational resources of the computing node are sufficient to execute the scheduled job, tracking module 212 may indicate to execution module 216 that the scheduled job is to execute on the computing node. In response to determining that the operational resources of the computing node are not sufficient to execute the scheduled job, tracking module may indicate to setup module 214 clean-up the computing node.

Setup module 214 may install, enable, remove, or disable one or more operational resources from computing node 222A-222C. In particular, setup module 214 may install or uninstall one or more application packages, install or uninstall an operating system, enable or disable one or more computer services, etc. Setup module 214 may receive instructions, from tracking module 212, on which operational resources to install, enable, remove, and/or disable. Once the clean-up is complete, setup module 214 may indicate to execution module 216 to execute the scheduled job.

Execution module 216 may initiate execution of the scheduled job on the computing node. In some embodiments, execution module 216 may receive an indication from a client (e.g., client 111), from tracking module 212, or from setup module 214 of which job to execute. In some embodiments, execution module 216 may select the next available job from job queue 234 in response to a command from the client, tracking module 212, or setup module 214.

Reporting module 218 may generate a pipeline log describing the progress of the operations performed by the computing nodes 222A-C. For example, the pipeline log may include data from the compiler log, the build output log, the unit test log, the integration test log, task failures, diagnostics data, etc. In some embodiments, reporting module 218 may generate an operational resources log indicating which operational resources are installed on or enabled by the computing node. The reporting module 218 may send the operational resources log to tracking module 212 to be used to determine whether the operational resources used by the computing node satisfy the requirements of a scheduled job. Alternatively, as discussed above, the computing node may generate the operational resources log during execution of any pipeline stage of an executing job.

In some embodiments, multiple computing nodes may be available to execute a job. In such embodiments, tracking module 212 may determine which computing node's operational resources are closest to the required operational resources of the job. In particular, tracking module 212 may determine, for each available computing node, a metric indicating how many application packages needed to be installed and/or uninstalled (e.g., each application package that needs to be installed or uninstalled adds value of 1 to the metric), and how many services needed to be enabled and/or disabled (e.g., each service that needs to be enabled or disabled adds value of 1 to the metric), and compare the values of each available computing node. In some embodiments, the metric may reflect an estimated complexity of the installing, uninstalling, enabling, and/or disabling one or more operational resources, the estimated time required to perform the installing, uninstalling, enabling, and/or disabling of the one or more operational resources, the estimated volume of code and/or data required to download and/or upload to the computing node, etc The computing node with the lowest metric may be selected for the job to execute on (once provisioned by setup module 214). In some embodiments, each configuration process (e.g., installing, uninstalling, enabling, disabling, etc.) may add a different value to the metric. For example, installing an application package may add a value of 4 to the metric, uninstalling an application package may add a value of 3 to the metric, enabling a computer service may add a value of 2 to the metric, and disabling a computing service may add a value of 1 to the metric. Each value may be predetermined during configuration of the client, set or modified by a user using user interface 125, etc. In some embodiments, if two computing nodes are both suitable (each include the required operational resources) to execute, tracking module may schedule the job on the computing node with fewer installed or enabled operational resources, weaker computing resources, or any combination thereof.

Figure 3:
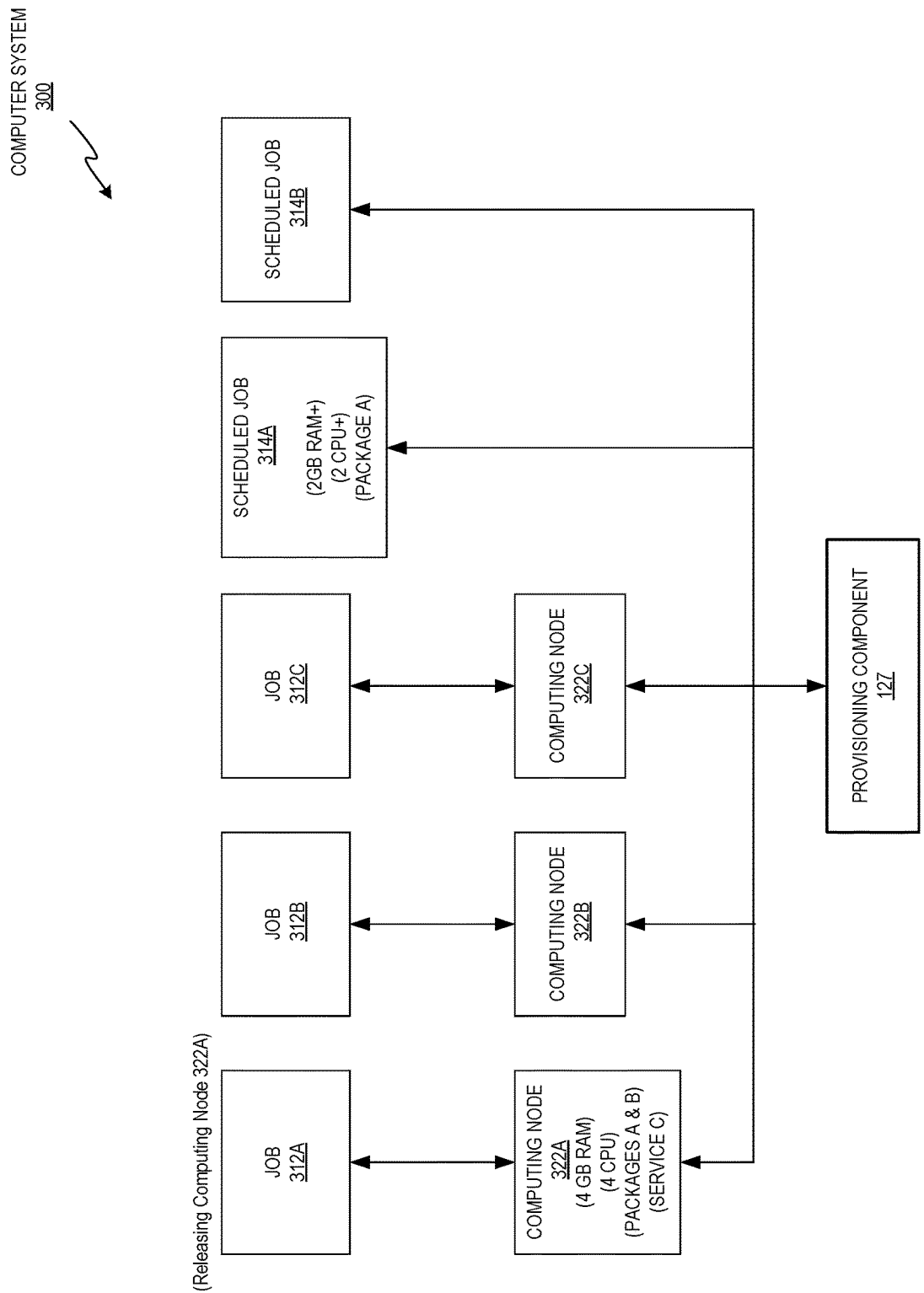
FIG. 3 depicts an example system scheduling jobs for execution on a provisioned computing node; in accordance with one or more aspects of the present disclosure

FIG. 3 schematically illustrates system 300 scheduling jobs for execution on a provisioned computing node, in accordance with one or more aspects of the present disclosure. In the example shown, FIG. 3 may include provisioning component 127, jobs 312A-312C, scheduled jobs 314A-314B, and computing nodes 322A-322C.

Jobs 312A-312C may be each be executing on computing nodes 322A-322C, respectively. In particular, job 312A may be executing on computing node 322A, job 312B may be executing on computing node 322B, and job 312C may be executing on computing node 322C. Computing node 322A may be executing the final stage of the pipeline of job 312A. Provisioning component 127 may receive data indicating that computing node 322A is scheduled to be released by job 312A, and that computing node 322A is provisioned with 4 GB of RAM, 4 CPUs, package A, package B, and service C. Provisioning component 127 may determine that scheduled job 314A is the next job in the build queue, and that scheduled job 314A requires 2 GB or more or RAM, 2 or more CPUs, and for package A to be installed. For example, provisioning component 127 may read the computing resources tags and the operational resource tags associated with scheduled job 314A. Provisioning component 127 may then compare the computing resource requirements of scheduled job 314A to the computing resources of computing node 322A, and the operational resource requirements of scheduled job 314A to the operational resources of computing node 322A. As shown, the computing resources and the operational resource requirements of computing node 322A satisfy the requirements of scheduled job 314A (computing node 322A includes at least 2 GBs of RAM, at least two CPUs, and package A). Thus, provisioning component 127 may execute scheduled job 314A on computing node 322A.

Figure 4:
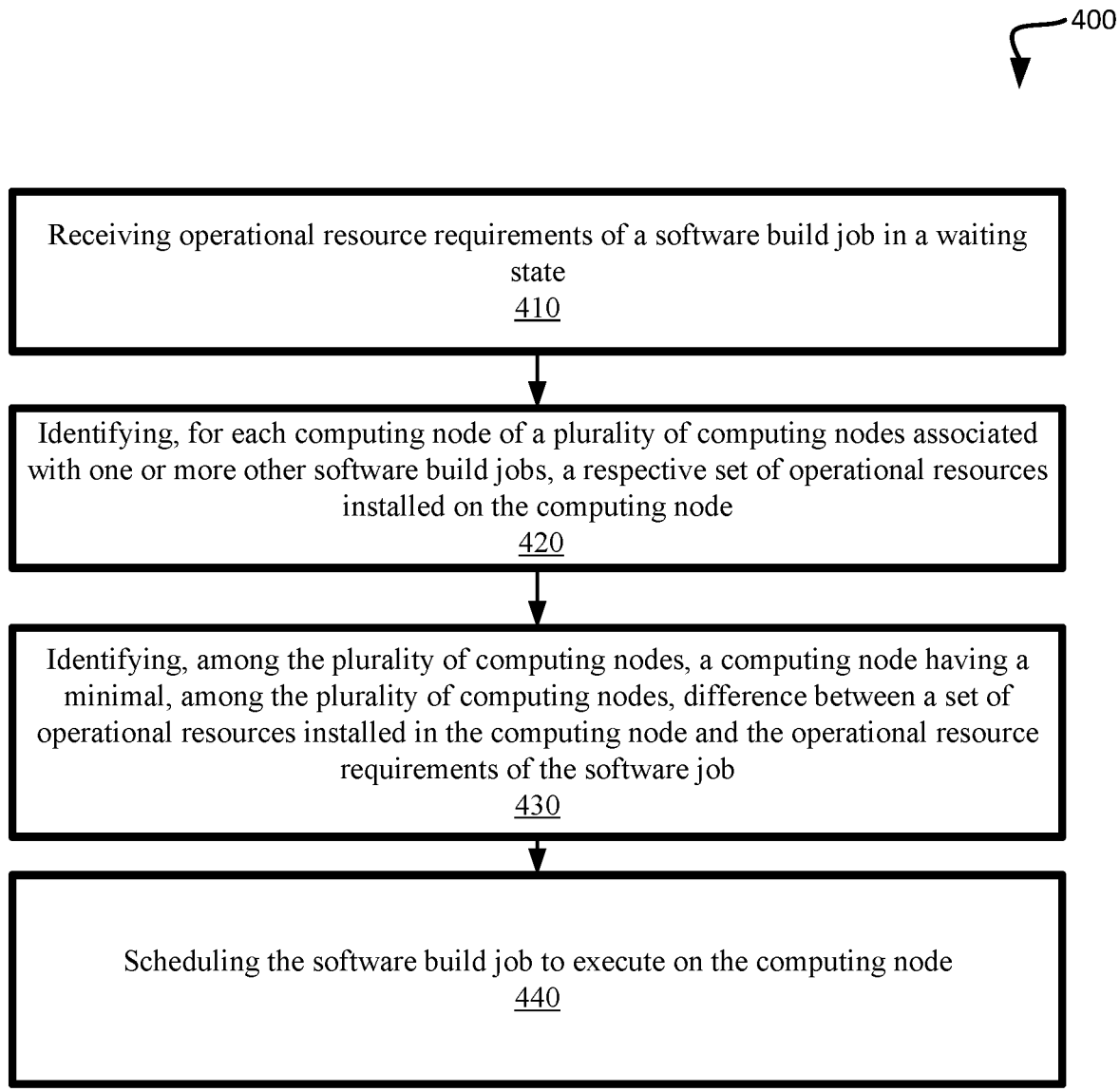
FIG. 4 depicts a flow diagram of an example method for scheduling jobs for execution on provisioned computing nodes, in accordance with one or more aspects of the present disclosure.

FIG. 4 depicts a flow diagram of an example method 400 for scheduling jobs for execution on provisioned computing nodes, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system may receive operational resource requirements of a software build job in a waiting state. An operational resource may include an operating system, an application package, and/or a computer service.

At block 420, the host computer system may identify, for each computing node of a plurality of computing nodes associated with one or more other software build jobs, a respective set of operational resources installed on the computing node. Identifying the respective sets operational resources of may include extracting operational resource data from a log file received from the computing node. The log file may be received while the respective computing node is executing a final stage of a pipeline of another software build job.

At block 430, the host computer system may identify, among the plurality of computing nodes, a computing node having a minimal, among the plurality of computing nodes, difference between a set of operational resources installed in the computing node and the operational resource requirements of the software job. In some embodiments, the difference may be characterized by a metric. The metric may reflect an estimated complexity of the installing, uninstalling, enabling, or disabling one or more operational resources required for the software job, the estimated time required to perform the installing, uninstalling, enabling, or disabling of the one or more operational resources required for the software job, the estimated volume of code and/or data, of one or more operation resources, required to download and/or upload, etc.

In some embodiments, responsive to determining that an operational resource needs to be installed on the computing node to satisfy the operational resource requirements of the software build job, the host computer system may install the operational resource on the computing node. In some embodiments, responsive to determining that an operational resource needs to be uninstalled on the computing node to satisfy the operational resource requirements of the software build job, the host computer system may uninstall the operational resource on the first computing node. In some embodiments, the host computer system may determine that an operational resource needs to be enabled on the computing node to satisfy the operational resource requirements of the software build job. For example, a computer service needs to be enabled. In response, the host computer system may enable said operational resource on the computing node. In some embodiments, the host computer system may determine that an operational resource needs to be disabled on the computing node to satisfy the operational resource requirements of the software build job. In response, the host computer system may disable said operational resource on the computing node.

At block 440, the host computer system may schedule the software build job to execute on the computing node. Responsive to completing the operations described herein above with references to block 440, the method may terminate.

Figure 5:
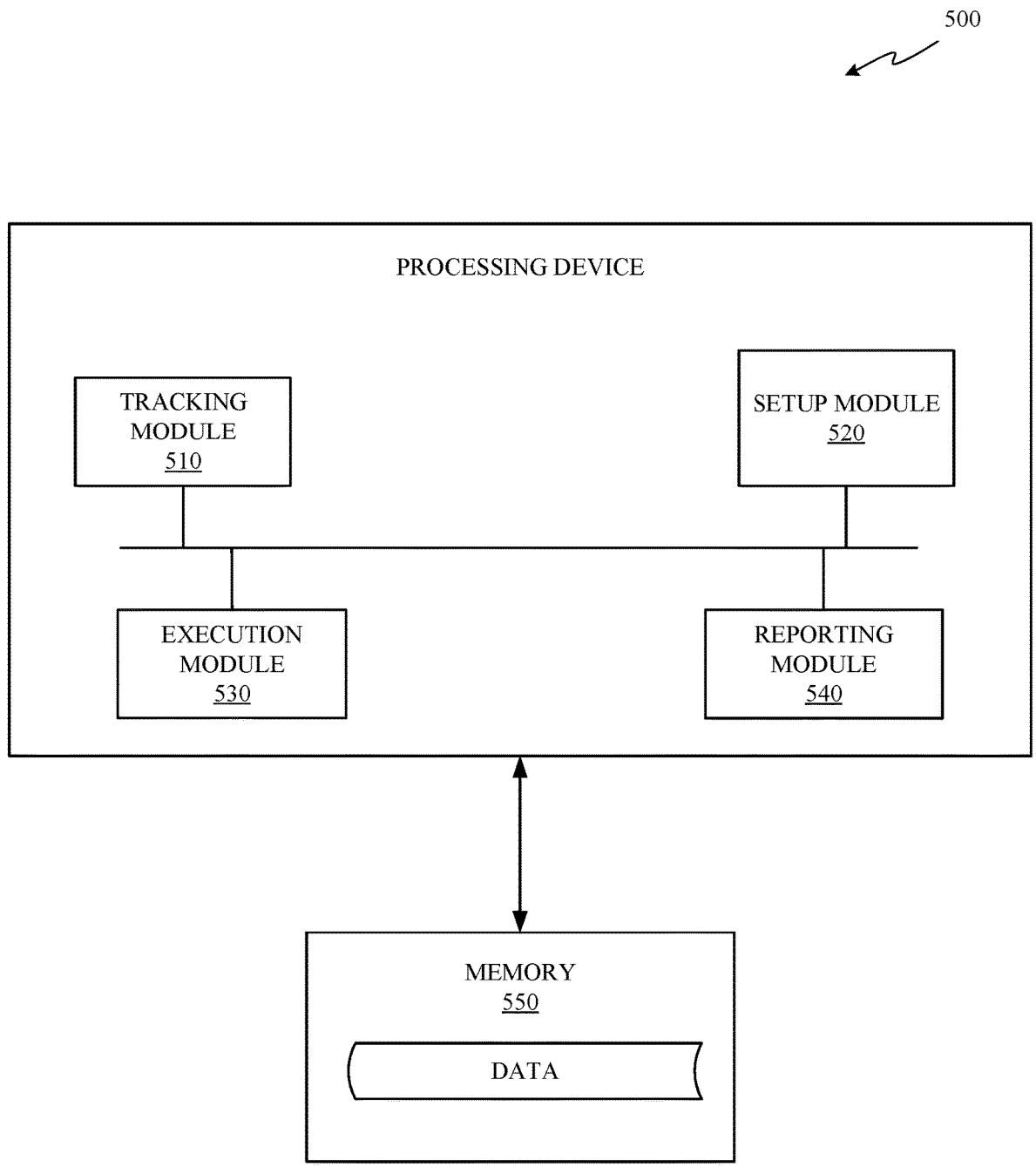
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may be the same or similar to client 111 or build server 101A-D of FIG. 1, and may include one or more processors and one or more memory devices. In the example shown, computer system 500 may include tracking module 510, cleanup module 520, execution module 530, reporting module 540, memory 550.

Tracking module 510 may receive operational resource requirements of a software build job in a waiting state. An operational resource may include an operating system, an application package, and/or a computer service.

Tracking module 510 may identify, for each computing node of a plurality of computing nodes associated with one or more other software build jobs, a respective set of operational resources installed on the computing node. Identifying the respective sets operational resources of may include extracting operational resource data from a log file received from the computing node. The log file may be received, from reporting module 540, while the respective computing node is executing a final stage of a pipeline of another software build job.

Setup module 520 may identify, among the plurality of computing nodes, a computing node having a minimal, among the plurality of computing nodes, difference between a set of operational resources installed in the computing node and the operational resource requirements of the software job. In some embodiments, the difference may be characterized by a metric. The metric may reflect an estimated complexity of the installing, uninstalling, enabling, or disabling one or more operational resources required for the software job, the estimated time required to perform the installing, uninstalling, enabling, or disabling of the one or more operational resources required for the software job, the estimated volume of code and/or data, of one or more operation resources, required to download and/or upload, etc.

In some embodiments, responsive to determining that an operational resource needs to be installed on the computing node to satisfy the operational resource requirements of the software build job, setup module 520 may install the operational resource on the computing node. In some embodiments, responsive to determining that an operational resource needs to be uninstalled on the computing node to satisfy the operational resource requirements of the software build job, setup module 520 may uninstall the operational resource on the first computing node. In some embodiments, setup module 520 may determine that an operational resource needs to be enabled on the computing node to satisfy the operational resource requirements of the software build job. For example, a computer service needs to be enabled. In response, setup module 520 may enable said operational resource on the computing node. In some embodiments, setup module 520 may determine that an operational resource needs to be disabled on the computing node to satisfy the operational resource requirements of the software build job. In response, the host computer system may disable said operational resource on the computing node.

Responsive to determining that the operational resource requirements of the first software build job are satisfied by the computing node, the execution module 530 may schedule the software build job to execute on the computing node.

Figure 6:
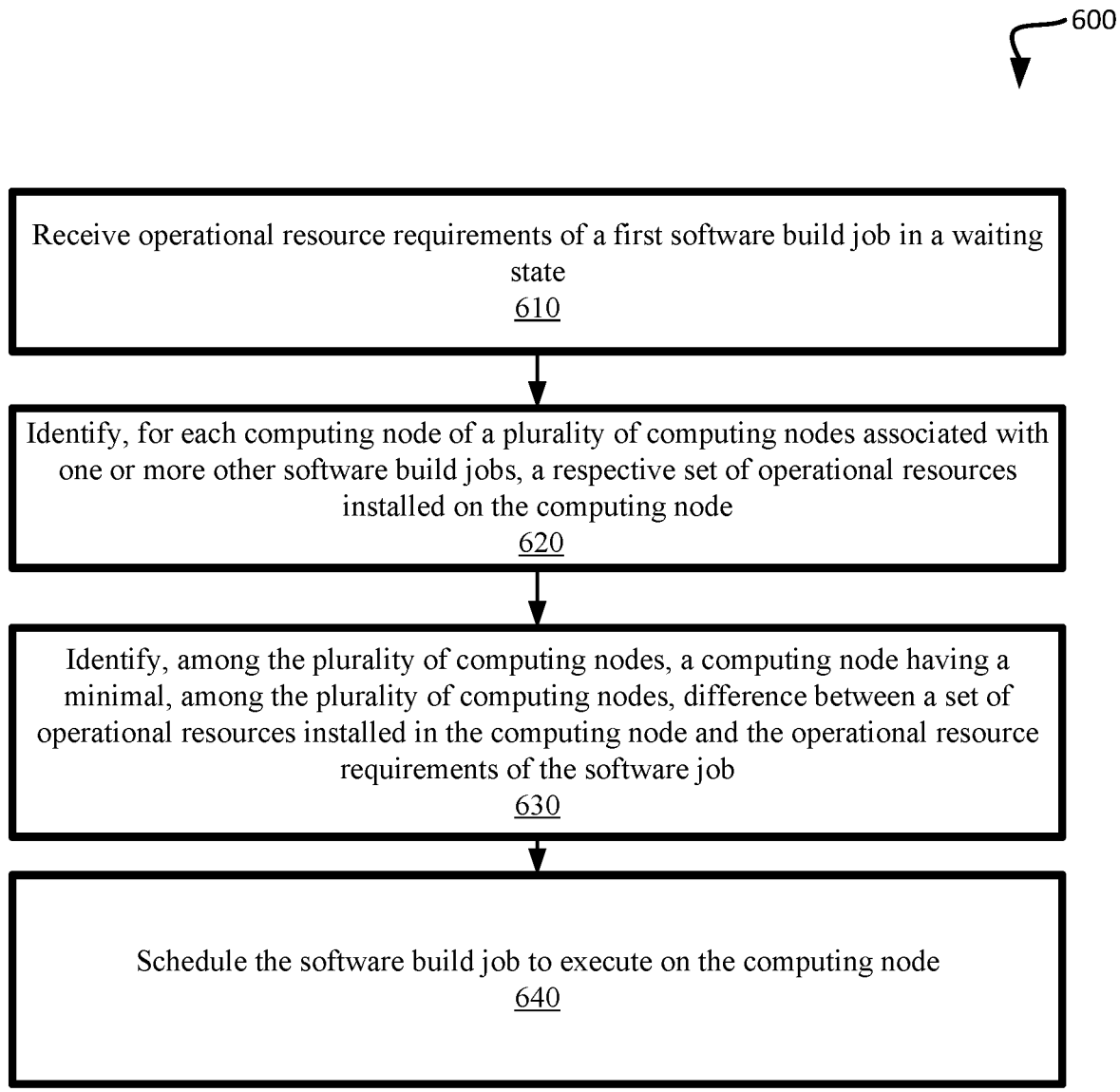
FIG. 6 depicts a flow diagram of another example method for scheduling jobs for execution on provisioned computing nodes, in accordance with one or more aspects of the present disclosure.

FIG. 6 depicts a flow diagram of one illustrative example of a method 600 for scheduling jobs for execution on provisioned computing nodes, in accordance with one or more aspects of the present disclosure. Method 600 may be similar to method 400 and may be performed in the same or a similar manner as described above in regards to method 600. Method 600 may be performed by processing devices of a server device or a client device and may begin at block 602.

At block 610, a processing device may receive operational resource requirements of a software build job in a waiting state. An operational resource may include an operating system, an application package, and/or a computer service.

At block 620, the processing device may identify, for each computing node of a plurality of computing nodes associated with one or more other software build jobs, a respective set of operational resources installed on the computing node. Identifying the respective sets operational resources of may include extracting operational resource data from a log file received from the computing node. The log file may be received while the respective computing node is executing a final stage of a pipeline of another software build job.

At block 630, the processing device may identify, among the plurality of computing nodes, a computing node having a minimal, among the plurality of computing nodes, difference between a set of operational resources installed in the computing node and the operational resource requirements of the software job. In some embodiments, the difference may be characterized by a metric. The metric may reflect an estimated complexity of the installing, uninstalling, enabling, or disabling one or more operational resources required for the software job, the estimated time required to perform the installing, uninstalling, enabling, or disabling of the one or more operational resources required for the software job, the estimated volume of code and/or data, of one or more operation resources, required to download and/or upload, etc.

In some embodiments, responsive to determining that an operational resource needs to be installed on the computing node to satisfy the operational resource requirements of the software build job, the processing device may install the operational resource on the computing node. In some embodiments, responsive to determining that an operational resource needs to be uninstalled on the computing node to satisfy the operational resource requirements of the software build job, the processing device may uninstall the operational resource on the first computing node. In some embodiments, the processing device may determine that an operational resource needs to be enabled on the computing node to satisfy the operational resource requirements of the software build job. For example, a computer service needs to be enabled. In response, the processing device may enable said operational resource on the computing node. In some embodiments, the processing device may determine that an operational resource needs to be disabled on the computing node to satisfy the operational resource requirements of the software build job. In response, the processing device may disable said operational resource on the computing node.

At block 640, the processing device may schedule the software build job to execute on the computing node. Responsive to completing the operations described herein above with references to block 640, the method may terminate.

Figure 7:
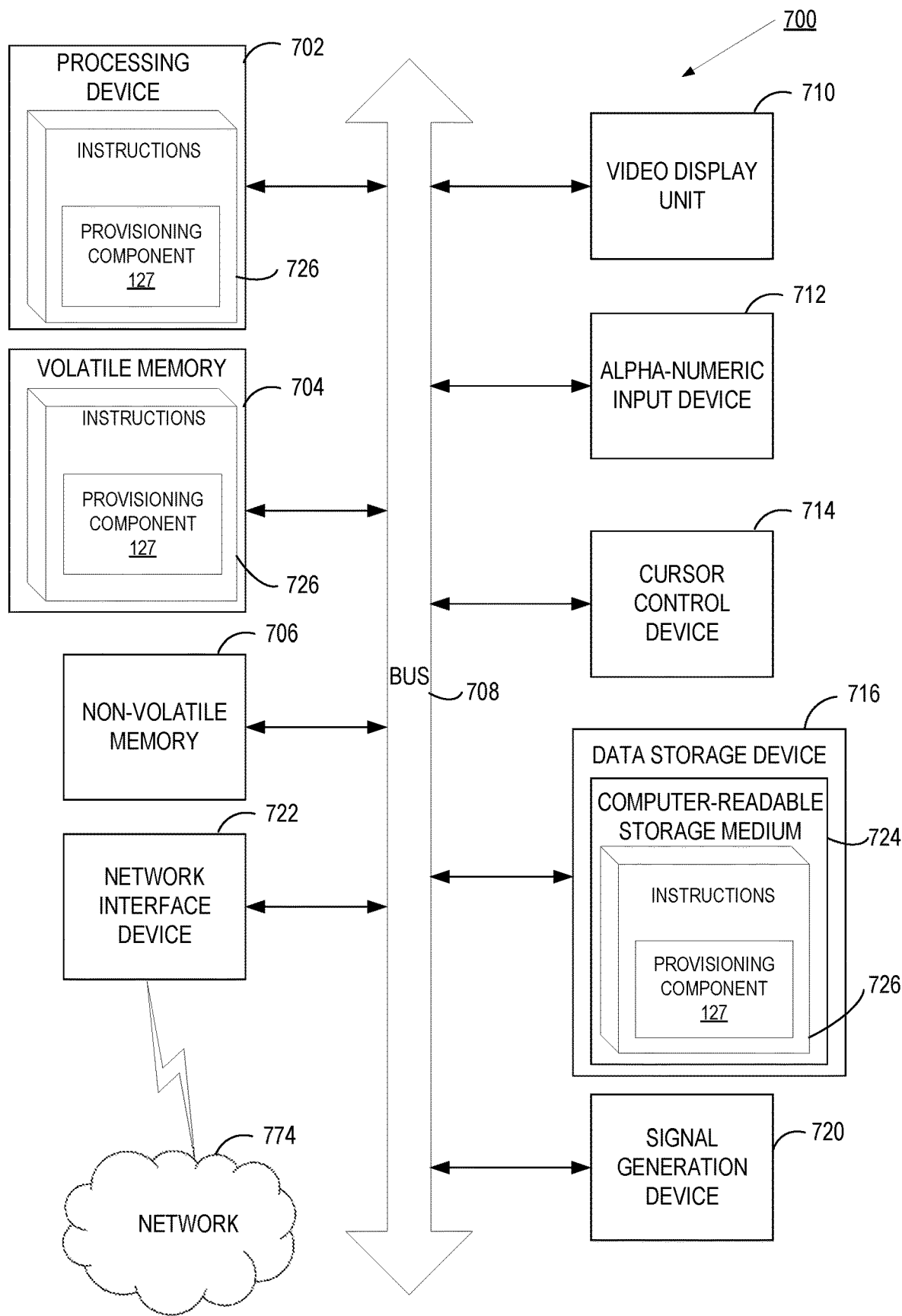
FIG. 7 depicts a block diagram of an example computer system operating in accordance with one or more aspects of the present disclosure.

FIG. 7 depicts a block diagram of a computer system operating in accordance with one or more aspects of the present disclosure. In various illustrative examples, computer system 700 may correspond to computing environment 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 and 600.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 6500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processor, operational resource requirements of a software build job in a waiting state;
   identifying, for each computing node of a plurality of computing nodes associated with one or more other software build jobs, a respective set of operational resources installed on the computing node;
   identifying, among the plurality of computing nodes, a computing node having a minimal, among the plurality of computing nodes, difference between a set of operational resources installed in the computing node and the operational resource requirements of the software build job;
   responsive to determining that an operational resource is to be uninstalled on the computing node to satisfy the operational resource requirements of the software build job, uninstalling the operational resource on the computing node; and
   scheduling the software build job to execute on the computing node.

2. The method of claim 1, further comprising:
   responsive to determining that an operational resource needs to be installed on the computing node to satisfy the operational resource requirements of the software build job, installing the operational resource on the computing node.

3. The method of claim 1, wherein an operational resource comprises at least one of an operating system, an application package, or a computer service.

4. The method of claim 1, wherein identifying the respective set of operational resources installed on the computing node comprises extracting operational resource data from a log file received from the computing node.

5. The method of claim 4, wherein the log file is received while the computing node is executing a final stage of a pipeline of another software build job.

6. The method of claim 1, further comprising:
   responsive to determining that an operational resource needs to be enabled on the computing node to satisfy the operational resource requirements of the software build job, enabling the operational resource on the computing node.

7. A system comprising:
   a memory;
   a processing device operatively coupled to the memory, the processing device configured to:
   receive operational resource requirements of a software build job in a waiting state;
   identify, for each computing node of a plurality of computing nodes associated with one or more other software build jobs, a respective set of operational resources installed on the computing node;
   identify, among the plurality of computing nodes, a computing node having a minimal, among the plurality of computing nodes, difference between a set of operational resources installed in the computing node and the operational resource requirements of the software build job;
   responsive to determining that an operational resource is to be uninstalled on the computing node to satisfy the operational resource requirements of the software build job, uninstall the operational resource on the computing node; and
   schedule the software build job to execute on the computing node.

8. The system of claim 7, wherein the processing device is further configured to:
   responsive to determining that an operational resource needs to be installed on the computing node to satisfy the operational resource requirements of the software build job, install the operational resource on the computing node.

9. The system of claim 7, wherein an operational resource comprises at least one of an operating system, an application package, or a computer service.

10. The system of claim 7, wherein identifying the respective set of operational resources installed on the computing node comprises extracting operational resource data from a log file received from the computing node.

11. The system of claim 10, wherein the log file is received while the computing node is executing a final stage of a pipeline of another software build job.

12. The system of claim 7, wherein the processing device is further configured to:
   responsive to determining that an operational resource needs to be enabled on the computing node to satisfy the operational resource requirements of the software build job, enable the operational resource on the computing node.

13. A non-transitory machine-readable storage medium storing executable instructions that, when executed by a processing device, cause the processing device to:
   receive operational resource requirements of a software build job in a waiting state;
   identify, for each computing node of a plurality of computing nodes associated with one or more other software build jobs, a respective set of operational resources installed on the computing node;

identify, among the plurality of computing nodes, a computing node having a minimal, among the plurality of computing nodes, difference between a set of operational resources installed in the computing node and the operational resource requirements of the software build job;

responsive to determining that an operational resource is to be uninstalled on the computing node to satisfy the operational resource requirements of the software build job, uninstall the operational resource on the computing node; and schedule the software build job to execute on the computing node.

14. The non-transitory machine-readable storage medium of claim 13, further comprising executable instructions that, when executed by the processing device, cause the processing device to:

responsive to determining that an operational resource needs to be installed on the computing node to satisfy the operational resource requirements of the software build job, install the operational resource on the computing node.

15. The non-transitory machine-readable storage medium of claim 13, wherein an operational resource comprises at least one of an operating system, an application package, or a computer service.

16. The non-transitory machine-readable storage medium of claim 13, wherein identifying the respective set of operational resources installed on the computing node comprises extracting operational resource data from a log file received from the computing node, wherein the log file is received while the computing node is executing a final stage of a pipeline of another software build job.

17. The non-transitory machine-readable storage medium of claim 13, further comprising executable instructions that, when executed by the processing device, cause the processing device to:

responsive to determining that an operational resource needs to be enabled on the computing node to satisfy the operational resource requirements of the software build job, enabling the operational resource on the computing node.

* * * * *